(No Model.)
P. H. BROWN.
DEVICE FOR FELLING TREES.
No. 415,442. Patented Nov. 19, 1889.
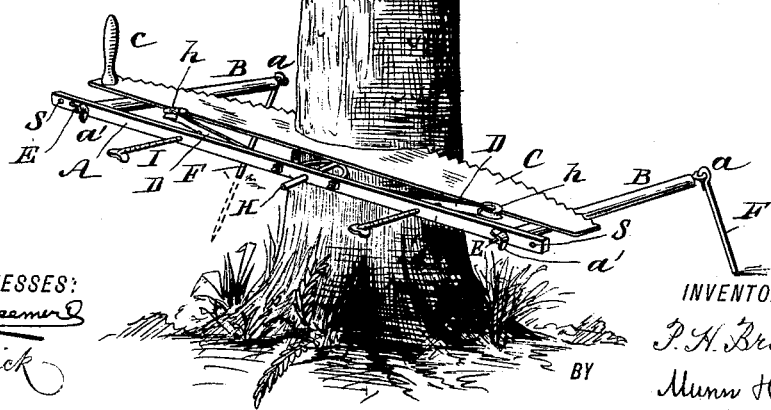
WITNESSES:
INVENTOR:
P. H. Brown
BY Munn & Co.
ATTORNEYS.

UNITED STATES PATENT OFFICE.

PERCY HULL BROWN, OF VESUVIUS BAY, SALTSPRINGS ISLANDS, BRITISH COLUMBIA, CANADA.

DEVICE FOR FELLING TREES.

SPECIFICATION forming part of Letters Patent No. 415,442, dated November 19, 1889.

Application filed July 6, 1889. Serial No. 316,664. (No model.)

*To all whom it may concern:*

Be it known that I, PERCY HULL BROWN, of Vesuvius Bay, Saltsprings Island, in the Province of British Columbia and Dominion of Canada, have invented a new and Improved Device for Felling Trees, of which the following is a full, clear, and exact description.

The object of my invention is to provide a simple, practical, portable device, by the employment of which a crosscut-saw of ordinary form may be readily operated by one man, and trees of a thickness within the capacity of the device be sawed off near the surface of the ground.

With this object in view the invention consists in the novel construction and combination of the several parts, as will be hereinafter fully described, and pointed out in the claims.

Reference is to be had to the accompanying drawings, forming a part of this specification, in which similar letters of reference indicate corresponding parts in all the figures.

Figure 1 is a top plan view of the portable frame on which the crosscut-saw is placed when in use to cut through the body of a tree. Fig. 2 is a side elevation of the frame shown in Fig. 1, and Fig. 3 is a perspective view illustrating the device in position secured upon the body of a standing tree, and showing the manner of adjusting the frame in connection with a tree, and a crosscut-saw in place on the frame ready to saw off the tree-trunk.

To provide a light portable device is one of the essential features of my invention. To this end a bracket-bar A, preferably made of hard wood and having a proper length for the purpose it subserves, is provided near each end with two or more spaced holes $s$, into which are introduced the ends of the bolts E, passing through the long axially-bored rollers B, which may be made of wood or metal. The bolts E have the eyes $a$ formed on one end of each. The other ends that enter the holes in the ends of the bracket-bar A are threaded, and winged thumb-nuts $a'$ are screwed upon them after the parts named are assembled, as shown in Fig. 1. The bolts E hold the rollers B extended from the bracket-bar at right angles thereto and parallel to each other. Two rods F, having close-turned hooks, are coupled by these hooked ends to the eyes $a$ of the bolts E, thus affording a loose connection between the rods and bolts. As will be seen in Fig. 3, the rods F constitute legs for the stable support of the rear ends of the rollers B, the pointed ends $b$ of these legs rendering their insertion into the soil near the tree easy of accomplishment.

At a central point in the bracket-bar A there is made a hole of proper diameter for the reception of the spike-bar H, which is inserted therein from the inner face of the bracket-bar A. On the body of the spike-bar H two projecting curved arms $e$ are formed. These are located oppositely on the spike-bar, and are given a suitable curvature, so that their bolt ends $e'$ may be inserted through holes in the bracket-bar and be secured thereto by nuts or other means. The curved portions of the arms $e$ have collars $f$ formed on them at the inner side of the bar A, to bear against the ends of the spring carrier-plates D, which are perforated for the passage of the bolt ends $e'$, which, being inserted through said perforations, hold the carrier-plates D firmly in place when the nuts of the bolt ends $e'$ are tightened against the face of the bracket-bar A. The inner end $g$ of the spike-bar H is pointed to allow it to be driven into the body of the tree which is to be operated upon.

The carrier-plates D are constructed of elastic steel, and their free forward ends are impinged upon by the ends of the set-screw bolts I, which are inserted through threaded holes in the bar A at proper points to bend the spring carrier-plates D and project the free ends of said plates away from the adjacent surface of the bar A. The free ends of the carrier-plates D are bifurcated to form ears $h$, in which are pivoted the grooved pulleys $h'$. The pulleys $h'$ are deeply channeled, of a width to loosely fit the rear edge portion of a saw-blade C, which, when in position for use, is placed with its ends resting flatwise on the rollers B, as shown in Fig. 3.

It will be apparent from the foregoing description that the parts as combined will form a light portable frame, which may be secured at different heights from the ground-surface by the insertion in the tree-body of the pointed end of the spike-bar H, which is effected by strokes of a sledge or maul upon the head of the said spike-bar. The rear ends of the rollers B are adjusted by means of the legs F, so as to cause the bodies of the rollers to lie in or near a horizontal plane.

When the frame is arranged in place, as stated, the saw C is laid upon the rollers so that its toothed edge will bear upon the body of the tree and have its rear edge inserted in the grooved pulleys $h'$. The spring carrier-plates D are given a sufficient "set" or bend forward by the set-screw bolts I, which are turned by their winged heads $i'$, so as to cause a proper tensional action of the carrier-plates and thus feed the saw forward as it is reciprocated, a projecting handle $c$ being provided for the movement of the saw endwise. After the saw has been operated until the tensional action of the plates D ceases, this may be renewed by further turning in the set-screw bolts I to press against the carrier-plates D.

It will be evident that any desired position with regard to height from the ground and any angle of inclination of the saw-kerf may be secured by adjustment of the spike-bar H and legs F of the portable frame.

In the construction of this device it is necessary that the parts thereof be proportioned relative to the diameter of trees that are to be operated upon.

The apparatus, if slightly modified, may be utilized to cut off fence-posts, or other timber may be cut crosswise by its use. The preferred use is the felling of trees, for which purpose it is particularly available, as it may be manually transported to a forest and such trees as may be selected can be easily and speedily felled, the labor of one man being sufficient to accomplish such work when this improved device is employed.

Having thus described my invention, I claim as new and desire to secure by Letters Patent—

1. The combination, with an elongated bracket-bar, two rollers revolubly secured to the ends of this bar by bolts that support them in position at right angles to the bar, and two rods loosely secured to the outer ends of said bolts, of a spike-bar clamped to the bracket-bar near its longitudinal center, and spring carrier-plates that are adapted to press against the back of a crosscut-saw blade, substantially as set forth.

2. The combination, with an elongated bracket-bar perforated at spaced intervals near each end, eyebolts which are inserted in revoluble rollers and are adapted to be secured in either of these spaced holes, and longitudinally-perforated rollers, of two rods which serve as legs and are jointed to the eyebolts, a spike-bar secured to the bracket-bar near its longitudinal center, so as to clamp fast the ends of two spring carrier-plates to the bracket-bar, and two spring carrier-plates that are adapted to exert their tensional force against the back edge of a crosscut-saw blade, substantially as set forth.

3. The combination, with a bracket-bar, two axially-perforated rollers, two eyebolts that support the rollers endwise against the bracket-bar, and two legs loosely connected to the ends of the eyebolts, of a spike-bar secured to the bracket-bar, two spring carrier-plates, two grooved pulleys pivoted on the free ends of the carrier-plates, two set-screw bolts, and a crosscut-saw blade, substantially as set forth.

PERCY HULL BROWN.

Witnesses:
 ERNEST V. BODWELL,
 FRANK C. WOLFENDEN.